US012512603B2

(12) United States Patent
Lin et al.

(10) Patent No.: US 12,512,603 B2
(45) Date of Patent: Dec. 30, 2025

(54) ANTENNA DEVICE

(71) Applicants: INVENTEC (PUDONG) TECHNOLOGY CORPORATION, Shanghai (CN); INVENTEC CORPORATION, Taipei (TW)

(72) Inventors: Hsin-Hung Lin, Taipei (TW); Yu Shu Tai, Taipei (TW); Wei-Chen Cheng, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 473 days.

(21) Appl. No.: 18/206,010

(22) Filed: Jun. 5, 2023

(65) Prior Publication Data

US 2024/0313421 A1 Sep. 19, 2024

(30) Foreign Application Priority Data

Mar. 14, 2023 (CN) ........................ 202310253376.2

(51) Int. Cl.
*H01Q 21/06* (2006.01)
*H01Q 5/335* (2015.01)

(52) U.S. Cl.
CPC ........... *H01Q 21/065* (2013.01); *H01Q 5/335* (2015.01)

(58) Field of Classification Search
None
See application file for complete search history.

(56) References Cited

U.S. PATENT DOCUMENTS

| | | | | |
|---|---|---|---|---|
| 6,018,319 | A * | 1/2000 | Lindmark | H01Q 13/106 343/770 |
| 11,145,983 | B1 * | 10/2021 | Tarng | H01Q 13/18 |
| 2024/0313420 | A1 * | 9/2024 | Lin | H01Q 21/065 |

* cited by examiner

*Primary Examiner* — Jany Richardson
(74) *Attorney, Agent, or Firm* — Maschoff Brennan

(57) ABSTRACT

An antenna device includes a first substrate, a second substrate, a radiation portion and an exciter. The second substrate is stacked on the first substrate. The exciter is disposed on the first substrate and includes a feeding transmission portion, an exciting portion, a connection portion and an impedance match portion. The feeding transmission portion is connected to a side of the exciting portion. The exciting portion and the impedance match portion are connected to two opposite sides of the connection portion, respectively. The radiation portion is located on the second substrate and includes a first radiation component, a second radiation component and a third radiation component. The first radiation component is disposed at a side of the second radiation component. The first radiation component and the second radiation component are disposed at a side of the third radiation component.

10 Claims, 10 Drawing Sheets

ANTENNA DEVICE

CROSS-REFERENCE TO RELATED APPLICATIONS

This non-provisional application claims priority under 35 U.S.C. § 119(a) on Patent Application No(s). 202310253376.2 filed in China, on Mar. 14, 2023, the entire contents of which are hereby incorporated by reference.

BACKGROUND OF THE INVENTION

Technical Field of the Invention

The invention relates to an antenna device, more particularly to an antenna device having a radiation portion and an exciter.

Description of the Related Art

With the advancement of wireless communication technology, electronic devices such as mobile phones and personal digital assistants have more diversified functions and enhanced performance, and become lighter and thinner. In particular, the wireless communication technology will enter the 6G era in 2030 and satisfy various requirements for life applications and business that 5G cannot meet.

Manufacturers need to design an antenna device in accordance with the frequency band applicable to the electronic product. However, the conventional antenna device is large in volume and is hard to be mounted in the electronic product. In this way, manufacturers need to design antenna devices in different manners to allow the antenna devices to be mounted in the inner spaces of different electronic products, which wastes time and increases manufacturing cost. Therefore, how to maintain the applicable signal frequency band of the antenna device and reduce the size of the antenna device to allow the antenna device to be suitable for various electronic products is an important issue to be solved.

SUMMARY OF THE INVENTION

The invention provides an antenna device so as to maintain the applicable signal frequency band of the antenna device and reduce the size of the antenna device to allow the antenna device to be suitable for various electronic products.

One embodiment of the invention provides an antenna device including a first substrate, a second substrate, a radiation portion and an exciter. The first substrate has a first top surface and a first bottom surface. The first top surface faces away from the first bottom surface. The second substrate is stacked on the first substrate and having a second top surface and a second bottom surface. The second top surface faces away from the second bottom surface. The second bottom surface is connected to the first top surface. The exciter is disposed on the first top surface and includes a feeding transmission portion, an exciting portion, a connection portion and an impedance match portion. The feeding transmission portion is connected to a side of the exciting portion. The exciting portion and the impedance match portion are connected to two opposite sides of the connection portion, respectively. Each of two opposite sides of the exciting portion has a concave point and a convex point. A line connecting the concave point and the convex point is arranged obliquely. The radiation portion is located on the second top surface and includes a first radiation component, a second radiation component and a third radiation component. The first radiation component is disposed at a side of the second radiation component. The first radiation component and the second radiation component are disposed at a side of the third radiation component. The exciting portion is located within a coverage of the radiation portion.

According to the antenna device disclosed by above embodiments, since the second substrate with the radiation portion is stacked on the first substrate with the exciter and the radiation portion is composed of the first radiation component, the second radiation component and the third radiation component disposed at a side of the first radiation component and a side of the second radiation component, the size of the antenna device can be reduced while the applicable signal frequency band of the antenna device can be maintained. Therefore, the antenna device is not required to be redesigned a plurality of times for inner spaces of different electronic products. Thus, the design process of the antenna device can be simplified, and the manufacturing cost can be reduced.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION

Figure 1:
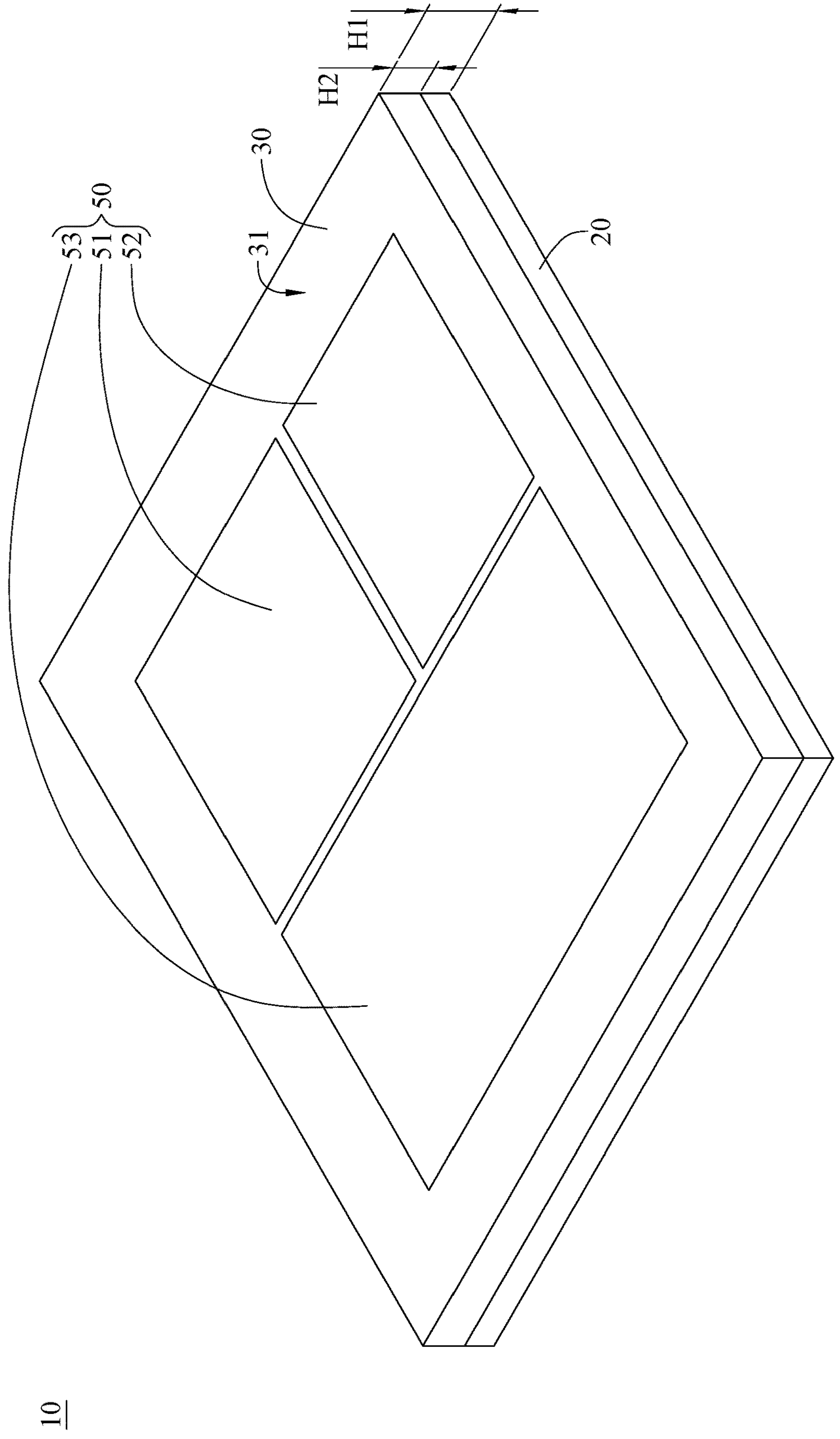
FIG. 1 is a perspective view of an antenna device in accordance with a first embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present invention, such as technical and scientific terms, have its own meanings and can be comprehended by those skilled in the art, unless the terms are additionally defined in the present invention. That is, the terms used in the following paragraphs should be read on the meaning commonly used in the related fields and will not be overly explained, unless the terms have a specific meaning in the present invention.

Figure 2:
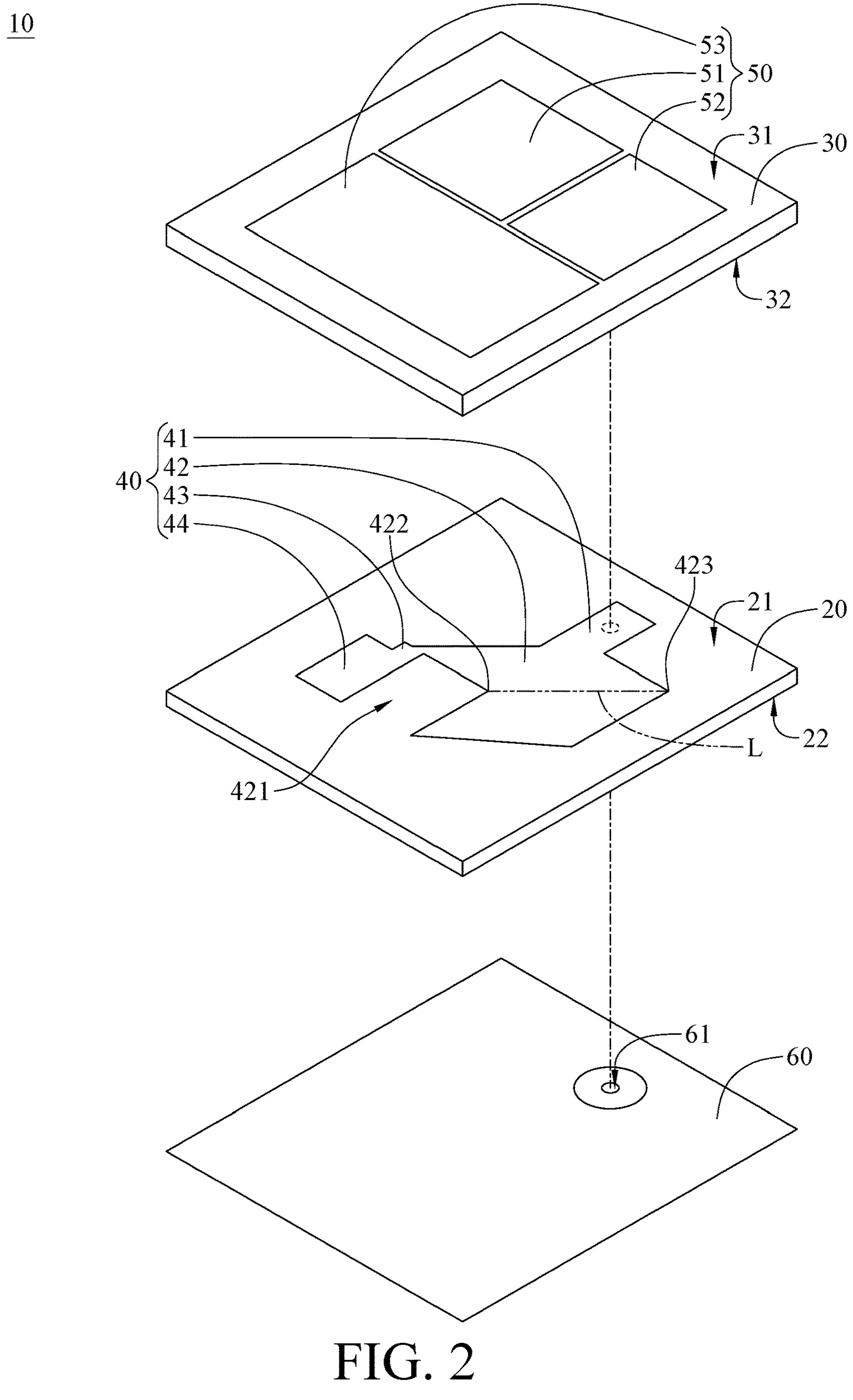
FIG. 2 is an exploded view of the antenna device in FIG. 1.

Please refer to FIG. 1 and FIG. 2, where FIG. 1 is a perspective view of an antenna device 10 in accordance with a first embodiment of the invention, and FIG. 2 is an exploded view of the antenna device 10 in FIG. 1.

In this embodiment, the antenna device 10 includes a first substrate 20, a second substrate 30, an exciter 40 and a radiation portion 50. The first substrate 20 and the second substrate 30 are made of, for example, glass fiber material. The first substrate 20 has a first top surface 21 and a first bottom surface 22. The first top surface 21 faces away from the first bottom surface 22. The second substrate 30 is stacked on the first substrate 20. The second substrate 30 has a second top surface 31 and a second bottom surface 32. The second top surface 31 faces away from the second bottom surface 32, and the second bottom surface 32 is connected to the first top surface 21.

In this embodiment, a length L1 of the first substrate 20 is 26 millimeters. A length L2 of the second substrate 30 is 26 millimeters. A width W1 of the first substrate 20 is 23 millimeters. A width W2 of the second substrate 30 is 23 millimeters. A thickness H1 of the first substrate 20 is 1 millimeter. A thickness H2 of the second substrate 30 is 1.4 millimeters.

Figure 3:
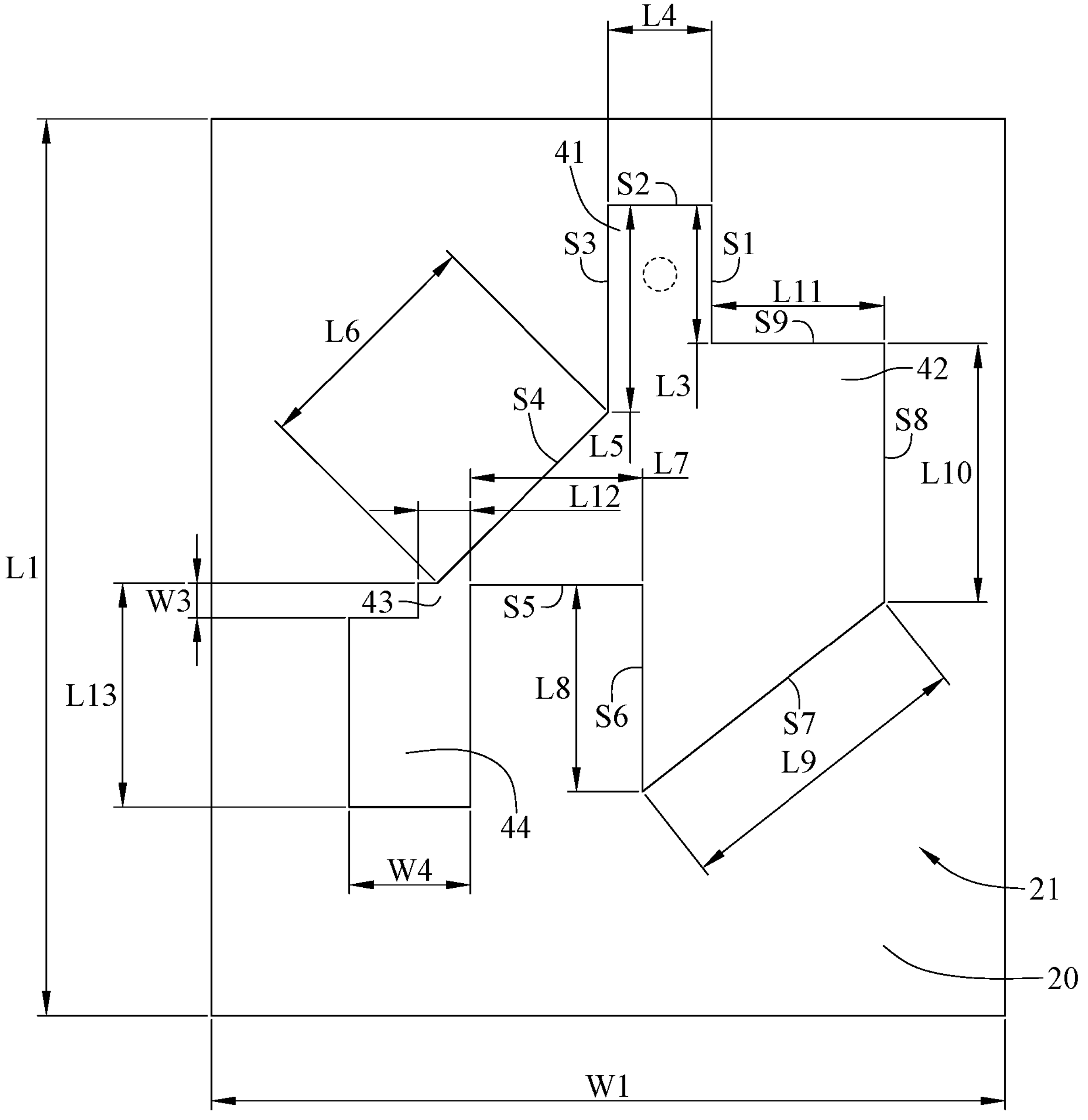
FIG. 3 is a plane view of a first substrate and an exciter of the antenna device in FIG. 1.
Figure 4:
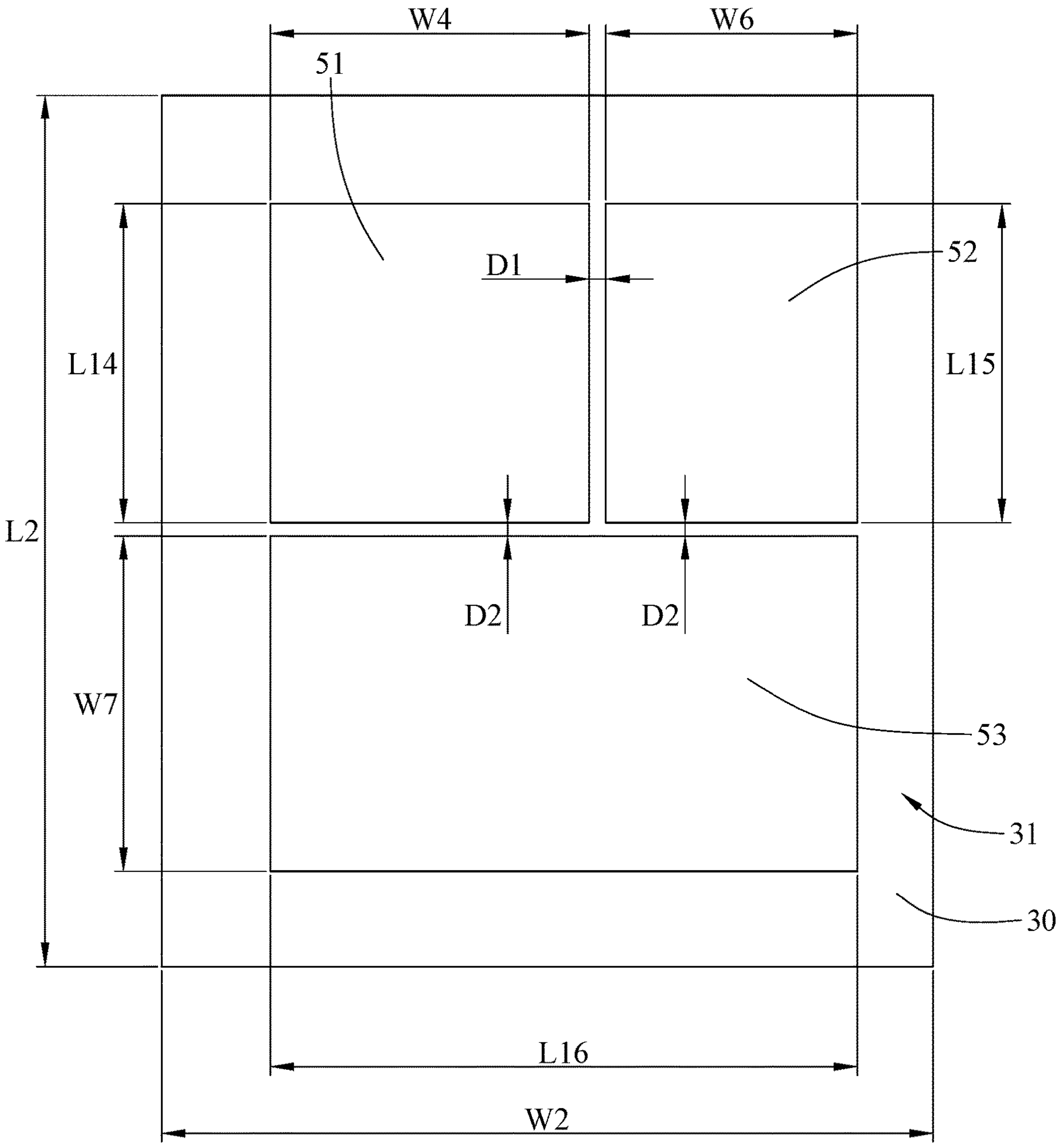
FIG. 4 is a plane view of a second substrate and a radiation portion of the antenna device in FIG. 1.

Please refer to FIG. 1 to FIG. 4, wherein FIG. 3 is a plane view of a first substrate and 20 an exciter 40 of the antenna device 10 in FIG. 1, and FIG. 4 is a plane view of a second substrate 30 and a radiation portion 50 of the antenna device 10 in FIG. 1.

The exciter 40 is disposed on the first top surface 21, and includes a feeding transmission portion 41, an exciting portion 42, a connection portion 43 and an impedance match portion 44. The feeding transmission portion 41 is connected to a side of the exciting portion 42. The exciting portion 42 and the impedance match portion 44 are connected to two opposite sides of the connection portion 43, respectively. The exciting portion 42 is in, for example, a polygonal shape, and is located within a coverage of the radiation portion 50. That is, the second substrate 30 is located between the radiation portion 50 and the exciter 40.

In this embodiment, the feeding transmission portion 41 of the exciter 40 has a first edge S1, a second edge S2 and a third edge S3. Two opposite ends of the second edge S2 are connected to an end of the first edge S1 and an end of the third edge S3, respectively. The exciting portion 42 of the exciter 40 has a fourth edge S4, a fifth edge S5, a sixth edge S6, a seventh edge S7, an eighth edge S8 and a ninth edge S9. An end of the fourth edge S4 is connected to another end of the third edge S3. An end of the fifth edge S5 is connected to another end of the fourth edge S4. An angle between the fourth edge S4 and the fifth edge S5 is less than 90 degrees. An end of the sixth edge S6 is connected to another end of the fifth edge S5. An angle between the fifth edge S5 and the sixth edge S6 is substantially equal to 90 degrees. An end of the seventh edge S7 is connected to another end of the sixth edge S6. An angle between the sixth edge S6 and the seventh edge S7 is less than 90 degrees. An end of the eighth edge S8 is connected to another end of the seventh edge S7. An angle between the seventh edge S7 and the eighth edge S8 is larger than 90 degrees. An end of the ninth edge S9 is connected to another end of the eighth edge S8. An angle between the eighth edge S8 and the ninth edge S9 is substantially equal to 90 degrees. Another end of the ninth edge S9 is connected to another end of the first edge S1. A part of an end of the connection portion 43 is connected to the fifth edge S5. The so-called "substantially equal to" means "equal to" or "similar to".

In this embodiment, the exciting portion 42 further has a recess 421, and each of two opposite sides of the exciting portion 42 has a concave point 422 and a convex point 423. The concave point 422 is located in the recess 421, and a line L connecting the concave point 422 and the convex point 423 is arranged obliquely. That is, the line L connecting the concave point 422 and the convex point 423 of the exciting portion 42 is non-parallel to one edge of the first substrate 20 and the third edge S3 of the exciter 40. With such recess 421 of the exciting portion 42, the frequency bandwidth of the antenna device 10 of the present invention is widened and the return loss is reduced, so that the size of the antenna device 10 can be reduced.

In this embodiment, a length L3 of the first edge S1 is 4 millimeters. A length L4 of the second edge S2 is 3 millimeters. A length L5 of the third edge S3 is 6 millimeters. A length L6 of the fourth edge S4 is 7 millimeters. A length L7 of the fifth edge S5 is 6.5 millimeters. A length L8 of the sixth edge S6 is 6 millimeters. A length L9 of the seventh edge S7 is 8.9 millimeters. A length L10 of the eighth edge S8 is 7.5 millimeters. A length L11 of the ninth edge S9 is 5 millimeters. A length L12 of the connection portion 43 is 1.5 millimeters. A width W3 of the connection portion 43 is 1 millimeter. A length L13 of the impedance match portion 44 is 5.5 millimeters. A width W4 of the impedance match portion 44 is 3.5 millimeters.

The radiation portion 50 is located on the second top surface 31, and includes a first radiation component 51, a second radiation component 52 and a third radiation component 53. The first radiation component 51 is disposed at a side of the second radiation component 52. The first radiation component 51 and the second radiation component 52 are disposed at a side of the third radiation component 53. The first radiation component 51 and the second radiation component 52 are spaced apart from each other by a first distance D1. The first radiation component 51 and the second radiation component 52 are spaced apart from the third radiation component 53 by a second distance D2. The first distance D1 is different from the second distance D2.

In this embodiment, the first radiation component 51 is disposed at a side of the second radiation component 52. The first radiation component 51 and the second radiation component 52 are disposed at a side of the third radiation component 53. The first distance D1 is different from the second distance D2. In this way, not only the antenna device 10 can support the n79 frequency band ranging from 4.4 gigahertz (GHz) to 5 GHz in the 5G frequency band or the WIFI-6E frequency band ranging from 5.925 GHz to 7.125 GHZ, but also the signal interference between the first to third radiation components 51, 52 and 53 and the return loss can be reduced when the first to third radiation components 51, 52 and 53 transfer signals.

In this embodiment, a length L14 and a width W5 of the first radiation component 51 are 9.5 millimeters. A length L15 of the second radiation component 52 is 9.5 millimeters. A width W6 of the second radiation component 52 is 7.5 millimeters. A length L16 of the third radiation component 53 is 17.5 millimeters. A width W7 of the third radiation component 53 is 10 millimeters. The first distance D1 is 0.5 millimeters. The second distance D2 is 0.4 millimeters.

In this embodiment, the antenna device 10 further includes a ground structure 60. The ground structure 60 is located on the first bottom surface 22 of the first substrate 20. The ground structure 60 has a feeding point 61. The feeding point 61 is connected to the feeding transmission portion 41 of the exciter 40. When a signal is fed into the feeding point 61 and transferred to the exciter 40 on the first substrate 20 to be excited, it can be radiated outward from the radiation portion 50 on the second substrate 30.

Figure 5:
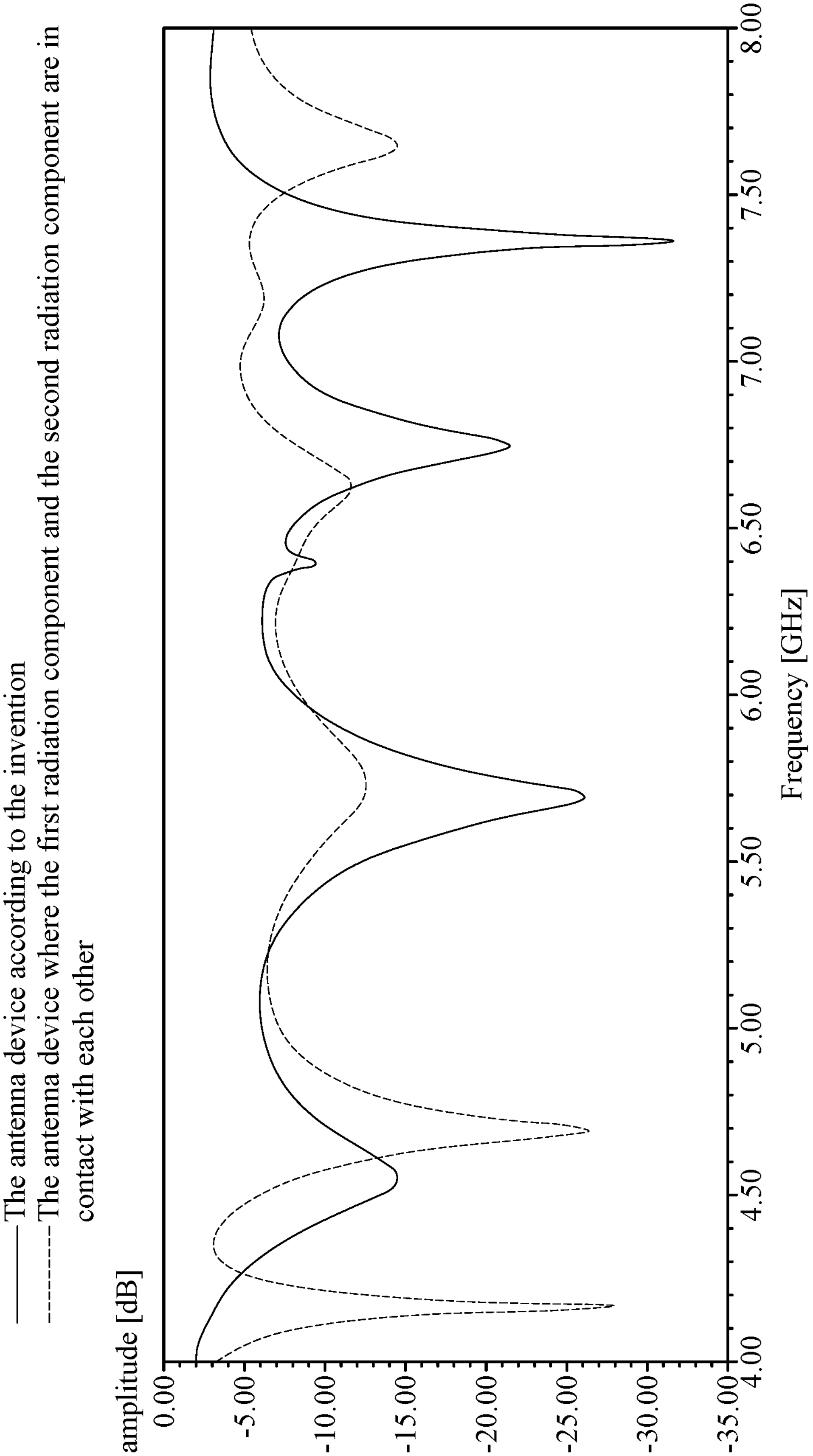
FIG. 5 is a graph showing return loss data among different antenna devices.

Please refer to FIG. 5, which is a graph showing return loss data among different antenna devices. As shown in FIG. 5, compared with the antenna device of a comparative example where the first radiation component and the second radiation component are in contact with each other, in the low frequency band ranging from 4.32 GHz to 4.5 GHZ, the return loss of the antenna device 10 of the present invention is lower than-6 dB (amplitude) or even lower than-10 dB. On the contrary, in the low frequency band ranging from 4.32 GHz to 4.5 GHZ, the return loss of the antenna device according to the comparative example is higher than-6 dB, so that the antenna device according to the comparative example cannot fully support the n79 frequency band in the 5G frequency band. In addition, in the high frequency band ranging from 6.84 GHz to 7.44 GHZ, the return loss of the antenna device 10 of the present invention is lower than-6 dB or even lower than-10 dB. On the contrary, in the low frequency band ranging from 4.32 GHz to 4.5 GHZ, the return loss of the antenna device according to the comparative example is higher than-6 dB. That is, due to the first distance D1 between the first radiation component 51 and the second radiation component 52, the return loss in the frequency bandwidth of the low frequency band and the high frequency band for the antenna device 10 of the present invention is reduced.

Figure 6:
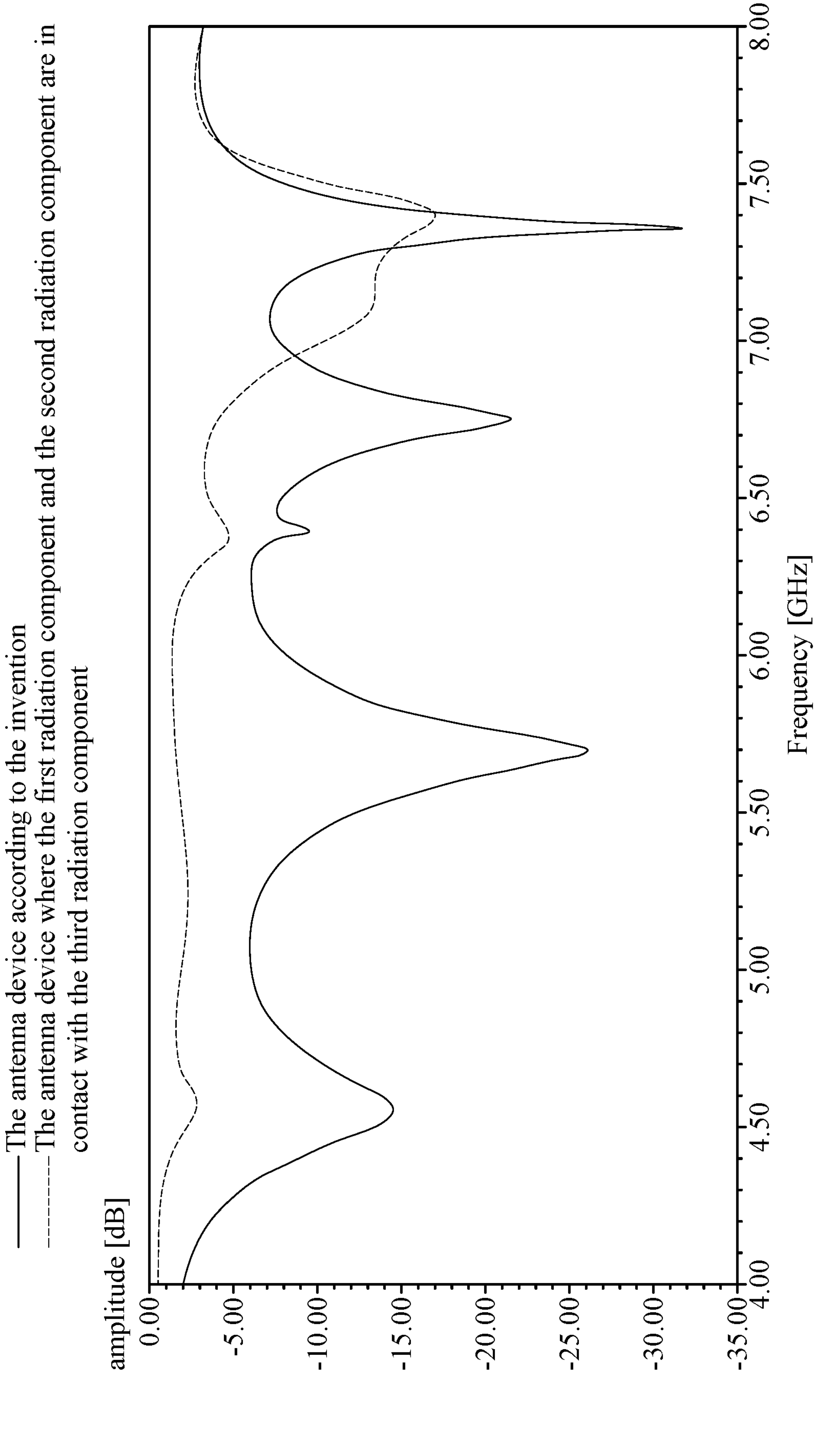
FIG. 6 is another graph showing return loss data among different antenna devices.

Please refer to FIG. 6, which is another graph showing return loss data among different antenna devices. As shown in FIG. 6, compared with the antenna device of a comparative example where the first radiation component and the second radiation component are in contact with the third radiation component, in the frequency band ranging from 4.32 GHz to 6.86 GHz, the return loss of the antenna device 10 of the present invention is lower than-6 dB or even lower than-10 dB. On the contrary, in the frequency band ranging from 4.32 GHz to 6.86 GHz, the return loss of the antenna device according to the comparative example is higher than-6 dB, so that the antenna device according to the and the WIFI-6E frequency band. That is, due to the first distance D2 between the first radiation component 51 and the second radiation component 52 and the third radiation component 53, the return loss in the frequency bandwidth of the n79 frequency band in the 5G frequency band and the WIFI-6E frequency band for the antenna device 10 of the present invention is reduced.

Figure 7:
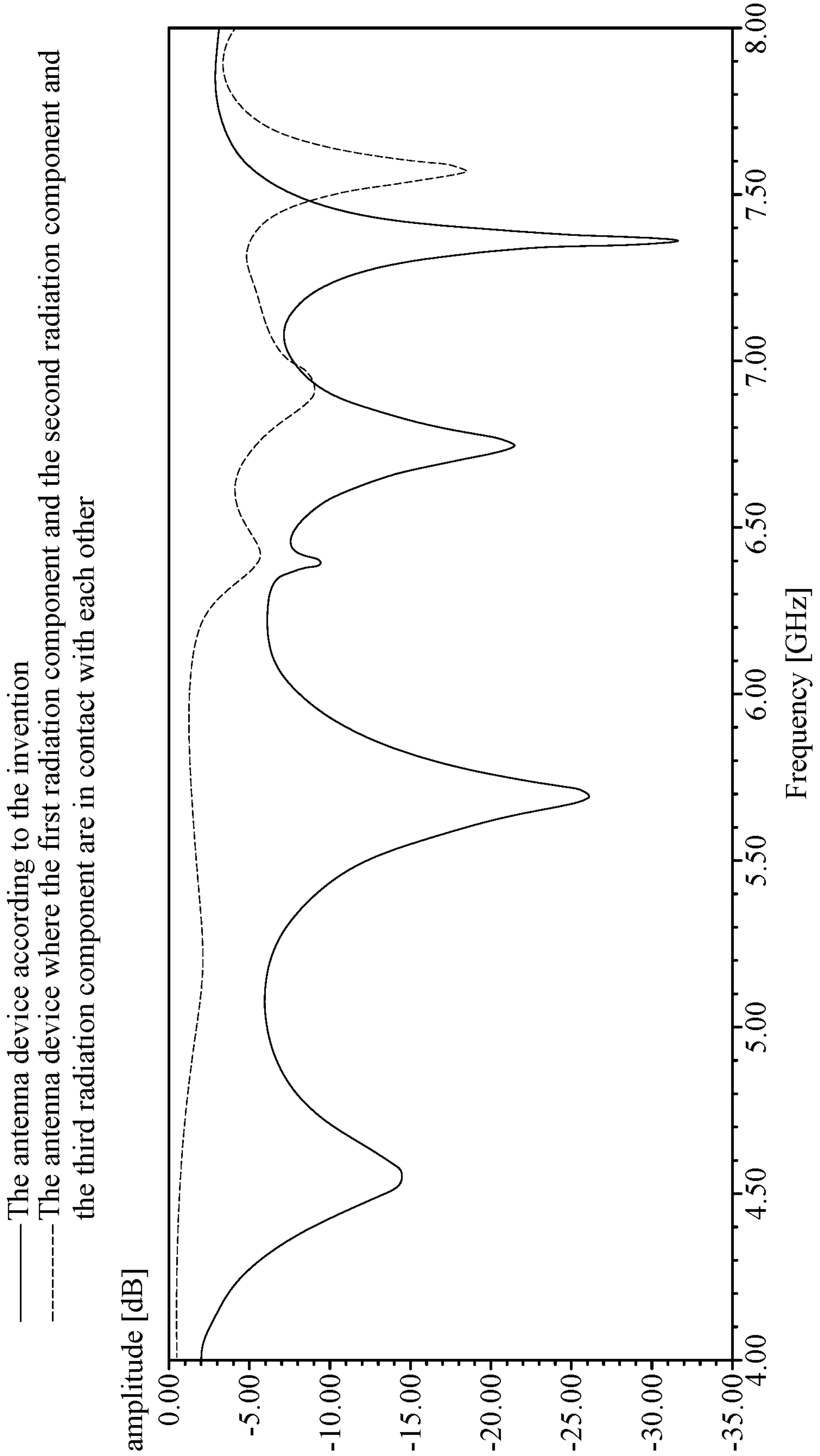
FIG. 7 is another graph showing return loss data among different antenna devices.

Please refer to FIG. 7, which is another graph showing return loss data among different antenna devices. As shown in FIG. 7, compared with the antenna device of a comparative example where the first radiation component and the second radiation component and the third radiation component are in contact with each other, in the frequency band ranging from 4.32 GHz to 7.13 GHz, the return loss of the antenna device 10 of the present invention is lower than-6 dB or even lower than-10 dB. On the contrary, in the frequency band ranging from 4.32 GHz to 6.86 GHZ, the return loss of the antenna device according to the comparative example in a partial frequency band is lower than-6 dB. In the rest of the aforementioned frequency band, the return loss is higher than-6 dB, so that the antenna device according to the comparative example cannot fully support the n79 frequency band in the 5G frequency band and the WIFI-6E frequency band. That is, due to the first distance D1 between the first radiation component 51 and the second radiation component 52 and the first distance D2 between the first radiation component 51 and the second radiation component 52 and the third radiation component 53, the return loss in the frequency bandwidth of the n79 frequency band in the 5G frequency band and the WIFI-6E frequency band for the antenna device 10 of the present invention is reduced.

Figure 8:
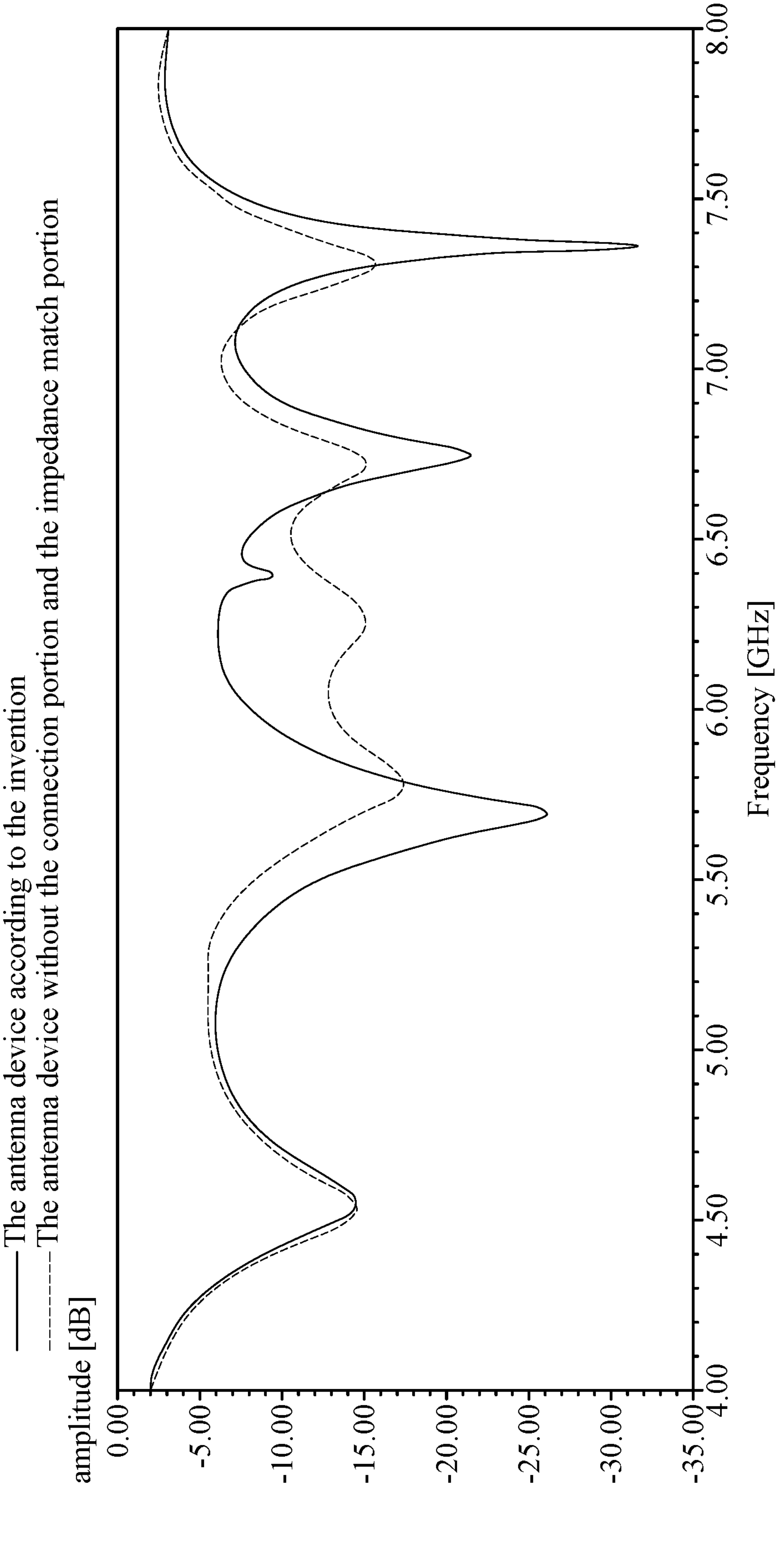
FIG. 8 is another graph showing return loss data among different antenna devices.

Please refer to FIG. 8, which is another graph showing return loss data among different antenna devices. As shown in FIG. 8, compared with the antenna device of a comparative example without the connection portion and the impedance match portion, in the frequency band ranging from 4.94 GHz to 5.36 GHZ, the return loss of the antenna device 10 of the present invention is lower than-6 dB. On the contrary, in the frequency band ranging from 4.94 GHz to 5.36 GHz, the return loss of the antenna device according to the comparative example is higher than-6 dB, so that the antenna device according to the and the WIFI-6E frequency band. That is, due to the connection portion 43 and the impedance match portion 44, the return loss in the frequency bandwidth of the n79 frequency band in the 5G frequency band and the WIFI-6E frequency band for the antenna device 10 of the present invention is reduced.

Figure 9:
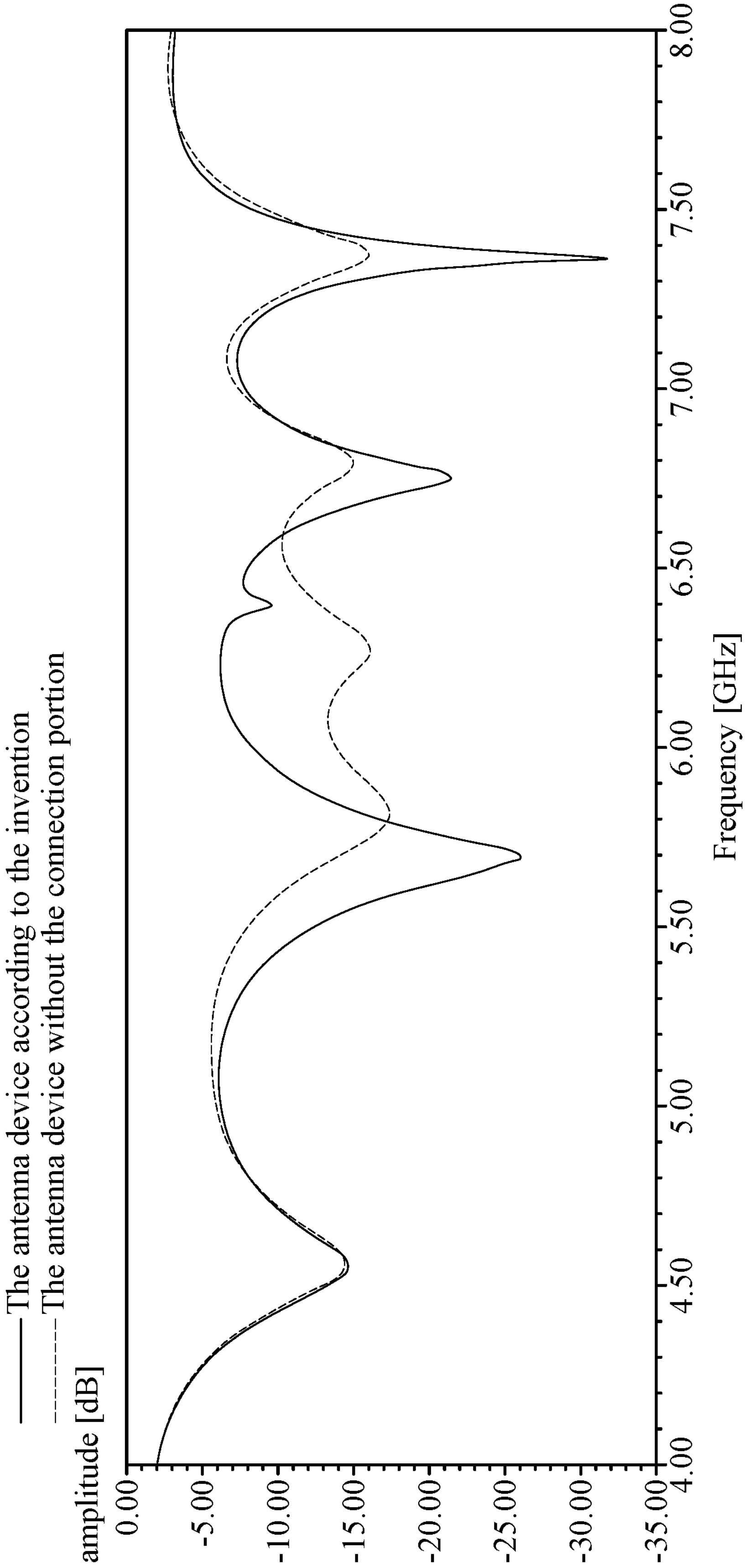
FIG. 9 is another graph showing return loss data among different antenna devices.

Please refer to FIG. 9, which is another graph showing return loss data among different antenna devices. As shown in FIG. 9, compared with the antenna device of a comparative example without the connection portion, in the frequency band ranging from 4.98 GHz to 5.32 GHz, the return loss of the antenna device 10 of the present invention is lower than-6 dB. On the contrary, in the frequency band ranging from 4.98 GHz to 5.32 GHZ, the return loss of the antenna device according to the comparative example is higher than −6 dB, so that the antenna device according to the comparative example cannot fully support the n79 frequency band in the 5G frequency band and the WIFI-6E frequency band. That is, due to the connection portion 43, the return loss in the frequency bandwidth of the n79 frequency band in the 5G frequency band and the WIFI-6E frequency band for the antenna device 10 of the present invention is reduced.

Figure 10:
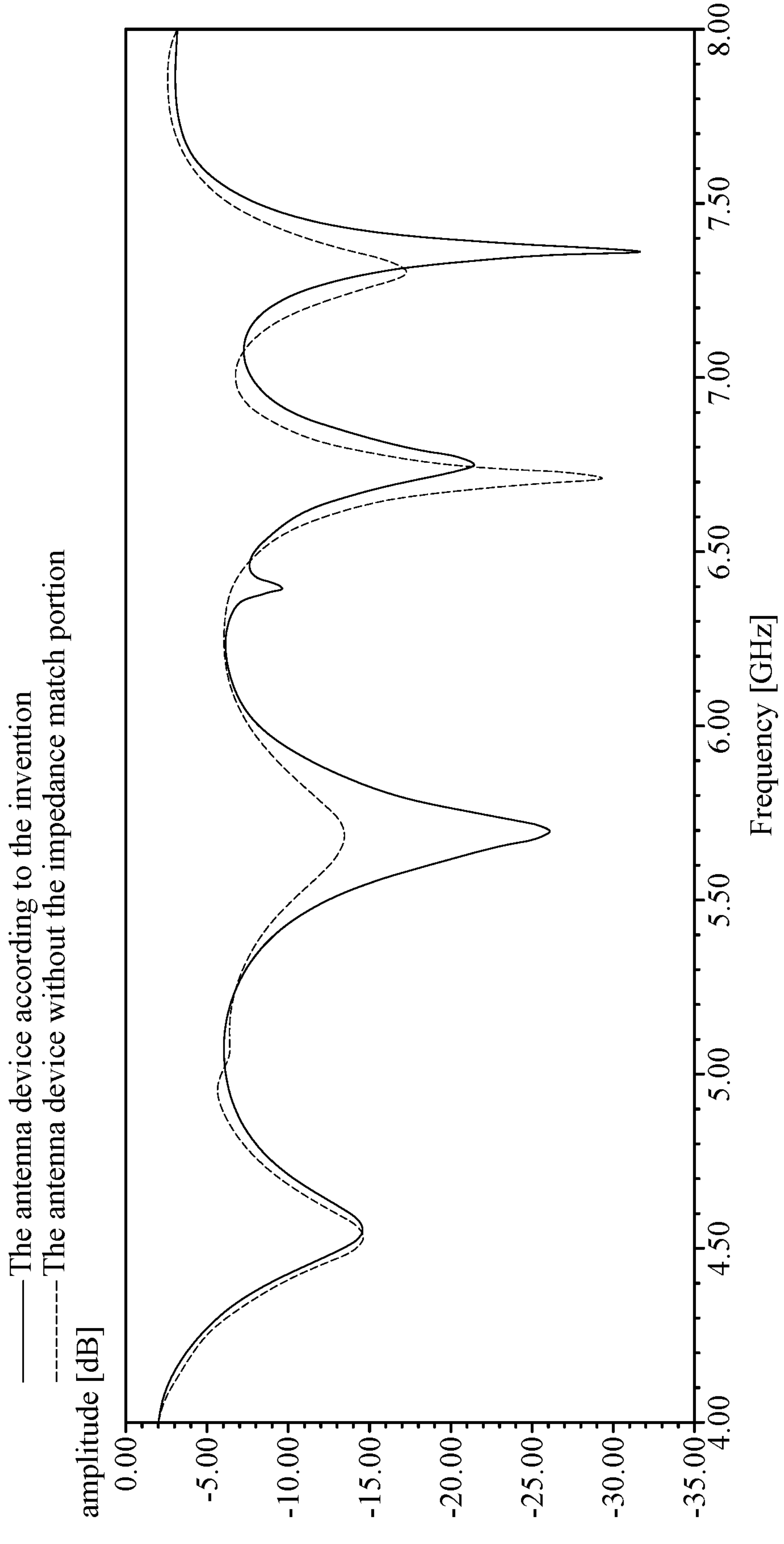
FIG. 10 is another graph showing return loss data among different antenna devices.

Please refer to FIG. 10, which is another graph showing return loss data among different antenna devices. As shown in FIG. 10, compared with the antenna device of a comparative example without the impedance match portion, in the low frequency band ranging from 4.89 GHz to 5.01 GHZ, the return loss of the antenna device 10 of the present invention is lower than-6 dB. On the contrary, in the low frequency band ranging from 4.89 GHz to 5.01 GHz, the return loss of the antenna device according to the comparative example is higher than-6 dB, so that the antenna device according to the comparative example cannot fully support the n79 frequency band in the 5G frequency band. In addition, in the high frequency band ranging from 6.21 GHz to 6.29 GHz, the return loss of the antenna device 10 of the present invention is lower than-6 dB. On the contrary, in the low frequency band ranging from 6.21 GHz to 6.29 GHz, the return loss of the antenna device according to the comparative example is higher than-6 dB. That is, due to the impedance match portion 44, the return loss in the frequency bandwidth of the low frequency band and the high frequency band for the antenna device 10 of the present invention is reduced.

According to the antenna device disclosed by above embodiments, the second substrate with the radiation portion is stacked on the first substrate with the exciter, and the radiation portion includes the first radiation component, the second radiation component and the third radiation component disposed at a side of the first radiation component and a side of the second radiation component. Thus, the size of the antenna device can be reduced while maintaining the applicable signal frequency band of the antenna device.

Therefore, the antenna device is not required to be redesigned a plurality of times to allow the antenna device to be mounted in inner spaces of different electronic products. Thus, the design process of the antenna device can be simplified, and the manufacturing cost can be reduced.

In addition, the exciting portion has a recess, and the line connecting the concave point in the recess and the convex point is non-parallel to one edge of the first substrate and the third edge of the exciter. Thus, the frequency bandwidth is widened and the return loss is reduced, so that the size of the antenna device can be further reduced.

It will be apparent to those skilled in the art that various modifications and variations can be made to the present invention. It is intended that the specification and examples be considered as exemplary embodiments only, with the scope of the invention being indicated by the following claims and their equivalents.

What is claimed is:

1. An antenna device, comprising:

a first substrate, having a first top surface and a first bottom surface, wherein the first top surface faces away from the first bottom surface;

a second substrate, stacked on the first substrate and having a second top surface and a second bottom surface, wherein the second top surface faces away from the second bottom surface, and the second bottom surface is connected to the first top surface;

an exciter, disposed on the first top surface and comprising a feeding transmission portion, an exciting portion, a connection portion and an impedance match portion, wherein the feeding transmission portion is connected to a side of the exciting portion, the exciting portion and the impedance match portion are connected to two opposite sides of the connection portion, respectively, each of two opposite sides of the exciting portion has a concave point and a convex point, and a line connecting the concave point and the convex point is arranged obliquely; and a radiation portion, located on the second top surface and comprising a first radiation component, a second radiation component and a third radiation component, wherein the first radiation component is disposed at a side of the second radiation component, the first radiation component and the second radiation component are disposed at a side of the third radiation component, and the exciting portion is located within a coverage of the radiation portion.

2. The antenna device according to claim 1, wherein the exciting portion of the exciter is in a polygonal shape and has a recess, and the concave point is located in the recess.

3. The antenna device according to claim 2, wherein the feeding transmission portion of the exciter has a first edge, a second edge and a third edge, two opposite ends of the second edge are connected to an end the first edge and an end of the third edge, respectively, the exciting portion of the exciter has a fourth edge, a fifth edge, a sixth edge, a seventh edge, an eighth edge and a ninth edge, an end of the fourth edge is connected to another end of the third edge, an end of the fifth edge is connected to another end of the fourth edge, an angle between the fourth edge and the fifth edge is less than 90 degrees, an end of the sixth edge is connected to another end of the fifth edge, an angle between the fifth edge and the sixth edge is substantially equal to 90 degrees, an end of the seventh edge is connected to another end of the sixth edge, an angle between the sixth edge and the seventh edge is less than 90 degrees, an end of the eighth edge is connected to another end of the seventh edge, an angle between the seventh edge and the eighth edge is larger than 90 degrees, an end of the ninth edge is connected to another end of the eighth edge, an angle between the eighth edge and the ninth edge is substantially equal to 90 degrees, another end of the ninth edge is connected to another end of the first edge, and a part of an end of the connection portion is connected to the fifth edge.

4. The antenna device according to claim 3, wherein the line connecting the concave point and the convex point of the exciting portion is non-parallel to one edge of the first substrate.

5. The antenna device according to claim 3, wherein the line connecting the concave point and the convex point of the exciting portion is non-parallel to the third edge of the exciter.

6. The antenna device according to claim 3, wherein a length of the first edge is 4 millimeters, a length of the second edge is 3 millimeters, a length of the third edge is 6 millimeters, a length of the fourth edge is 7 millimeters, a length of the fifth edge is 6.5 millimeters, a length of the sixth edge is 6 millimeters, a length of the seventh edge is 8.9 millimeters, a length of the eighth edge is 7.5 millimeters, a length of the ninth edge is 5 millimeters, a length of the connection portion is 1.5 millimeters, a width of the connection portion is 1 millimeter, a length of the impedance match portion is 5.5 millimeters, and a width of the impedance match portion is 3.5 millimeters.

7. The antenna device according to claim 1, wherein the first radiation component and the second radiation component are spaced apart from each other by a first distance, the first radiation component and the second radiation component are spaced apart from the third radiation component by a second distance, and the first distance is different from the second distance.

8. The antenna device according to claim 7, wherein a length and a width of the first radiation component are 9.5 millimeters, a length of the second radiation component is 9.5 millimeters, a width of the second radiation component is 7.5 millimeters, a length of the third radiation component is 17.5 millimeters, a width of the third radiation component is 10 millimeters, the first distance is 0.5 millimeters, and the second distance is 0.4 millimeters.

9. The antenna device according to claim 1, further comprising a ground structure located on the first bottom surface of the first substrate and having a feeding point, wherein the feeding point is connected to the feeding transmission portion of the exciter.

10. The antenna device according to claim 1, wherein a length of the first substrate is 26 millimeters, a length of the second substrate is 26 millimeters, a width of the first substrate is 23 millimeters, a width of the second substrate is 23 millimeters, a thickness of the first substrate is 1 millimeter, and a thickness of the second substrate is 1.4 millimeters.

* * * * *